United States Patent [19]
Yeomans

[11] Patent Number: 5,988,291
[45] Date of Patent: Nov. 23, 1999

[54] SOIL PENETRATING TOOL ASSEMBLY

[76] Inventor: Allan J. Yeomans, 60 Sunrise Boulevard, Surfers Paradise QLD 4217, Australia

[21] Appl. No.: 08/983,604
[22] PCT Filed: Jun. 30, 1995
[86] PCT No.: PCT/AU95/00396
   § 371 Date: Dec. 29, 1997
   § 102(e) Date: Dec. 29, 1997
[87] PCT Pub. No.: WO97/01949
   PCT Pub. Date: Jan. 23, 1997
[51] Int. Cl.⁶ ..................... A01B 61/04
[52] U.S. Cl. ............... 172/38; 172/261
[58] Field of Search ........... 172/38, 35, 5, 172/261, 263

[56] References Cited

U.S. PATENT DOCUMENTS

| | | | |
|---|---|---|---|
| 4,353,421 | 10/1982 | Lahti | 172/5 |
| 4,384,618 | 5/1983 | Williams | 172/38 X |
| 4,518,043 | 5/1985 | Anderson et al. | 172/38 X |
| 4,531,589 | 7/1985 | Williams | 172/38 X |
| 4,585,071 | 4/1986 | Anderson et al. | 172/38 X |

FOREIGN PATENT DOCUMENTS

| | | |
|---|---|---|
| 7944991 | 1/1992 | Australia . |
| 1908381 | 9/1970 | Germany . |
| 2259839 | 3/1993 | United Kingdom . |

OTHER PUBLICATIONS

Derwent Soviet Inventions Illustrated, Section III, Mechanical and General, vol. V, No. 16, Issued May 24, 1974, Miscellaneous, p. 3, SU 387642 A (Aleksandryan et al.) Oct. 9, 1973.
Derwent Abstract Accession No. K6412X/44, class P11, SU 498923 A (Voron Forest Inst) Apr. 14, 1976.

*Primary Examiner*—Christopher J. Novosad
*Attorney, Agent, or Firm*—Wood, Phillips, VanSanten, Clark & Mortimer

[57] ABSTRACT

A soil penetrating tool assembly (10) having a tool shank (18) which is pivotally mounted so as to clear obstructions in the ground. Movement of the shank away from its normal attitude is opposed by a hydraulic ram (22). The force required to be exerted by the shank (18) against the opposing force of the ram (22) is initially high but is reduced upon a predetermined movement of the tool (18) and thus a predetermined retraction of the ram (22). This allows the tool (18) to more easily clear large obstructions without causing damage to the tool (18).

34 Claims, 4 Drawing Sheets

SOIL PENETRATING TOOL ASSEMBLY

TECHNICAL FIELD

This invention relates to an improved soil penetrating tool assembly, and in particular to an assembly which has the capability of avoiding or jumping obstructions, for example stumps in the ground.

BACKGROUND ART

Soil penetrating tool assemblies are commonly used in the agricultural industry to break up soil to facilitate sowing of seeds or for other soil preparation procedures. The tool assemblies often include a shank which is sharpened at one end or alternatively provided with a soil penetrating tool and the shanks are mounted to a cultivator frame that is pulled by a tractor through a draw bar or mounted to a tool bar that is attached to the tractor by means of a three point hitch.

It has been common for the shanks of the tool assemblies to be releasably mounted to prevent damage to the shanks, frame, tool bar and/or the shank carrying implement when an obstruction is encountered in the soil.

Various devices have been used to attach tool assemblies and shanks to a cultivator frame. In one common configuration, a clamping assembly is clamped or bolted to the frame and the shank supported in a yoke to the clamping assembly by a mounting pin or bolt and a shear pin extending through sets of aligned holes. Where excessive obstructions or loads in the ground are encountered, the shank may pivot and cause the shear pin to break. In such arrangements and in other arrangements where shear pin systems are used, the breakage of a shear pin necessitates stopping the prime mover and replacement of the shear pin to enable ploughing to be recommenced.

Other arrangements have provided a spring system wherein a spring applies a biasing force to the shank to maintain the shank in the ground. The spring, however, normally is required to be of such a size as to exert as high as possible force on the shank to maintain it in the ground. Sufficient force to maintain the digging point in the ground in hard compacted soils would require springs of huge and impractical sizes.

Other systems have used hydraulic rams as a means for opposing movement of the shank out of the ground. These systems would require huge and impractical hydraulic rams to maintain penetration in hard compacted soils. Such large rams or large springs also subject the digging points and shanks to possible breakage during the obstruction jumping action when the shanks and points are in the raised non digging configuration. Furthermore, springs and rams in the above configurations are arranged to exert a force on the shank in such a manner that all movements of the shank will be opposed by the same force.

The present invention aims to overcome or alleviate one or more of the above described disadvantages or at least provide an alternative to the soil penetrating tool assemblies of the type described above. Other objects and advantages will become apparent from the following description.

SUMMARY OF THE INVENTION

The present invention thus provides in one aspect a soil penetrating tool assembly, said tool assembly including:

a soil penetrating tool arranged for movement between a lowered normal operating position and a raised position wherein said tool can pass an obstruction, fluid ram means associated with said tool, said ram means comprising a cylinder and piston means movable in said cylinder, fluid pressure relieving means associated with said ram means, said fluid pressure relieving means normally resisting displacement of fluid from said ram means and thereby movement of said piston means relative to said cylinder and movement of said tool from a said operating position, said fluid pressure relieving means permitting movement of said piston means relative to said cylinder and thus said movement of said tool when pressure of fluid within said ram means, consequent upon said tool encountering an obstruction, exceeds a predetermined maximum pressure, and valve means internally of said ram means, said valve means connecting said fluid ram means to a fluid supply having a pressure lower than said predetermined maximum pressure when said movement of said piston means exceeds a predetermined movement whereupon said tool is permitted to move towards a said raised position to pass said obstruction.

The valve means suitably includes a first valve part fixed against movement relative to the cylinder and a second valve part movable with the piston means. For supply of fluid from the fluid supply, a fluid supply tube may extend longitudinally into the cylinder, the valve means controlling communication between the tube and cylinder.

The cylinder of the ram means may be connected to an end housing at the end of the cylinder opposite the piston means. The end housing may be connected to the fluid supply and support the fluid supply tube which suitably comprises an elongated tubular member which communicates with the fluid pressure supply and which extends preferably coaxially through the cylinder and into the piston means. The free end of the tubular member may carry the first valve part of the valve means. The second valve part of the valve means adapted for cooperation with the first valve part may be arranged on the piston means, the valve parts normally cooperating to prevent fluid flow through the tubular member into the cylinder. Upon the predetermined movement of the piston means relative to the cylinder, the first and second valve parts separate to connect the cylinder through the tubular member to the reduced pressure of the fluid supply. The piston means is thus more easily permitted to move into the cylinder thus permitting movement of the tool away from its normal operating positions. The valve means defined by the first and second valve parts closes to close communication between the tubular member and cylinder when the piston means returns the tool back towards an operating position.

The first valve part is preferably in the form of an annular member or enlargement at the free end of the tubular member. The piston and piston rod of the piston means are preferably hollow such that the tubular member extends into the interior thereof. The second valve part carried by the piston means is preferably in the form of an annular insert within the piston and/or piston rod which in the closed position of the valve means is in sealing engagement with the first valve part at the end of the tubular member. The annular insert may be formed of plastics material. When subject to fluid pressure within the cylinder, the annular insert may expand so as to ensure sealing engagement with the valve part at the end of the tubular member.

The initial resistance to movement of the piston means is preferably established through a fluid pressure multiplier. A similar effect may be achieved using a spring loaded valve. The fluid pressure multiplier may include a stepped piston whose larger piston end is exposed to the system fluid pressure and whose smaller end normally communicates with the cylinder such that when the piston means of the ram means is initially retracted, its movement is opposed by the multiplied fluid pressure at the smaller end of the piston.

The soil penetrating tool of the tool assembly is preferably mounted for pivotal movement between its first and second attitudes. The tool assembly most commonly may be constructed so as to be mountable to a tool bar of an implement and for this purpose the tool assembly may include a clamp for mounting of the assembly to the tool bar. The tool may be supported to the tool bar through a linkage which in addition to the pivotal movement of the tool described above permits the tool to lift upwardly when striking or meeting an obstruction. The linkage may comprise a pivotal link assembly which is pivotally mounted at one end to the clamp and which pivotally supports at its opposite end the shank of the tool. The fluid ram means may be connected between the tool shank or an extension thereof and the clamp to normally maintain the tool in the ground in an operating position. The ram means may be pivotally connected to the clamp and to the shank. The ram cylinder suitably is pivotally connected to the clamp and the piston assembly of the ram pivotally connected to the tool or an extension thereof. Alternatively these connections may be reversed.

The ram means and associated fluid pressure relieving means permits the tool to undergo a first range of movement in its operating positions. This will occur when the load on the tool due to varying resistance in the ground is sufficient to move the piston means within the cylinder overcoming the relief pressure of the fluid pressure relieving means. On encountering a large obstruction in the ground however, a sufficient force will be applied to the tool tending to cause the tool to pivot in order to clear the obstruction with this movement being opposed by the fluid ram means until the fluid pressure therein exceeds the predetermined pressure as set by the fluid pressure relieving means. A predetermined movement of the tool and thus a predetermined movement of the piston means relative to the cylinder causes the valve means to connect the ram means to the fluid supply of lower pressure which allows the tool to more easily pivot upwardly to clear the obstruction. This may be achieved through a gradual pressure reduction from the first predetermined pressure to the lower pressure or may be a stepped pressure reduction.

The reduced fluid pressure within the cylinder due to its connection to the fluid supply also serves to urge the tool back towards its normal operating position. During movement of the piston means urging the tool back towards its operating position the valve means will close such that the tool in its normal operating positions is again required to overcome the increased pressure set by the fluid pressure relieving means and move the predetermined distance before the ram means is connected to the lower pressure fluid supply to allow it to move clear of large obstructions as before.

For return of the piston means to its fully extended position with the tool in an operating position, fluid is supplied primarily through the tubular member and open valve means into the cylinder. When the valve means is closed upon the predetermined extension movement of the piston means causing the valve parts again coming into register with each other, fluid to the cylinder can no longer be supplied through the tubular member. In this instance fluid to the cylinder is supplied through an auxiliary passage connected to the system fluid supply. To reduce shock loadings as the tool returns towards an operating position the auxiliary passage may be reduced in cross-section or include a portion of reduced cross-section to limit the flow to the cylinder and thereby reduce the speed of movement of the piston means as it returns the tool to an operating position.

Whilst the tool may be mounted through a linkage assembly as described to a tool bar it may if desired be directly pivotally mounted to the clamp which clamps the tool assembly to the tool bar. The tool assembly of course may be mounted to a prime mover by any other suitable arrangement for example through a three point linkage. The tool may be of any suitable type as required to achieve ploughing or other earth working and may include a fixed tip or removable tip.

In yet a further aspect, the present invention provides a soil penetrating tool assembly, said tool assembly including a soil penetrating tool, support means for said tool, linkage means pivotally connected to said tool and said support means for supporting said tool for movement between a lowered normal operating position and a raised position wherein said tool can pass an obstruction, fluid ram means pivotally connected between said tool and said support means, said ram means comprising a cylinder and a piston means movable in said cylinder, fluid pressure relieving means associated with said ram means, said fluid pressure relieving means normally resisting displacement of fluid from said ram means and thereby movement of said piston means relative to said cylinder and movement of said tool from a said operating position, said fluid pressure relieving means permitting movement of said piston means relative to said cylinder and thus said movement of said tool when pressure of fluid within said ram means, consequent upon said tool encountering an obstruction, exceeds a predetermined maximum pressure, and valve means internally of said ram means, said valve means connecting said fluid ram means to a fluid supply having a pressure lower than said predetermined maximum pressure when said movement of said piston means exceeds a predetermined movement whereupon said tool is permitted to move towards a said raised position to pass said obstruction.

In yet a further aspect, the present invention provides a fluid ram assembly, said ram assembly including a cylinder and a piston means movable in said cylinder, fluid pressure relieving means resisting displacement of fluid from said fluid ram assembly and thereby resisting movement of said piston means in said cylinder from a first position unless pressure of fluid within said ram assembly exceeds a predetermined maximum pressure, and valve means internally of said ram means, said valve means connecting said ram means to a fluid supply having a pressure lower than said predetermined pressure upon a predetermined movement of said piston means in said cylinder from said first position to allow a less restricted movement of said piston means in said cylinder away from said first position.

BRIEF DESCRIPTION OF THE DRAWINGS

In order that the invention may be more readily understood and put into practical effect, reference will now be made to the accompanying drawings which illustrate a preferred embodiment of the invention and wherein.

DETAILED DESCRIPTION OF THE EMBODIMENT

Figure 1:
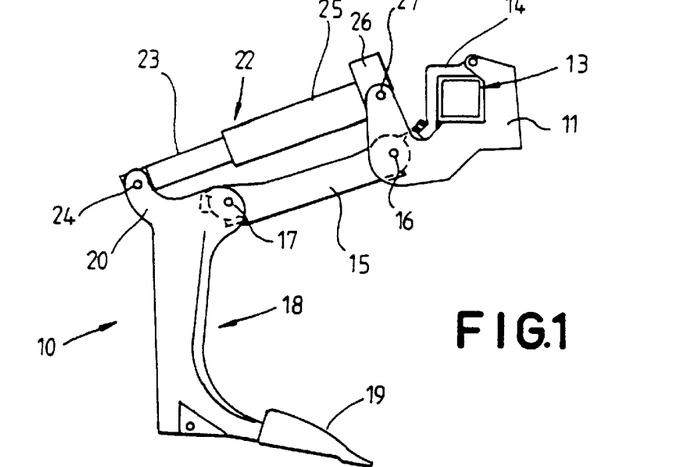
FIG. 1 illustrates a tool assembly according to the present invention in a first operative attitude.
Figure 2:
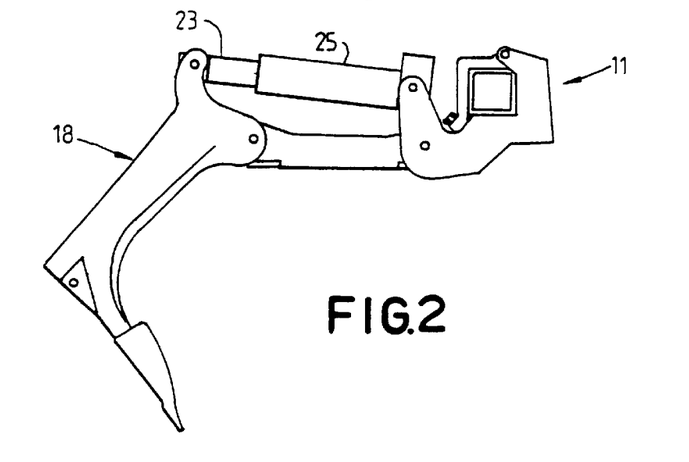
FIG. 2 illustrates the tool assembly of FIG. 1 with the shank of the tool partially raised to clear an obstruction.
Figure 3:
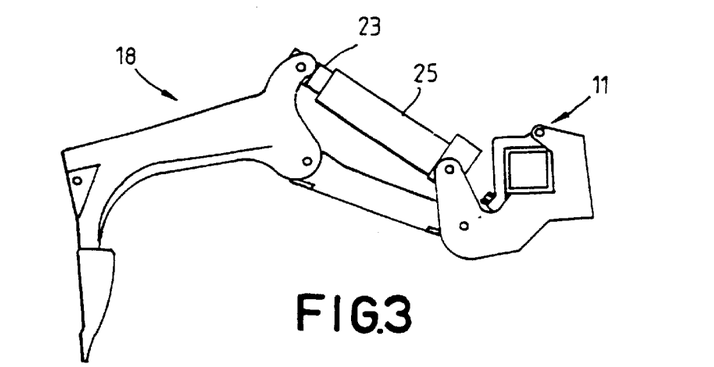
FIG. 3 illustrates the tool assembly of FIG. 1 with the shank assembly raised further to clear an obstruction.

Referring to the drawings and firstly to FIGS. 1 to 3 there is illustrated a soil penetrating tool assembly 10 according to the present invention, including a tool support member 11 which is adapted to be mounted to a tool bar 12 and which for this purpose includes a first fixed jaw 13 which is arranged to engage a pair of adjacent faces of the tool bar 12. A clamping plate 14 is adapted to co-operate with the tool bar 12 and member 11 to clamp the tool assembly 10 to the tool bar 12. The support member 11 pivotally supports a link assembly 15 through a pivot connection 16. The link assembly 15 at its opposite end supports via a pivot connection 17 a tool shank 18 which may carry at its lower end a soil penetrating tool 19 which may comprise a removable tip.

The shank 18 includes a pair of spaced ears 20 and a similar pair of spaced ears 21 are provided on the support member 11. Extending betweeen the respective pairs of ears 20 and 21 is an hydraulic ram 22 which is adapted to maintain the shank 18 in the ground. The ram 22 includes a piston assembly 23 pivotally mounted at 24 to the ears 20 and a cylinder 25 terminating in a valve block 26 pivotally mounted at 27 between the ears 21. Thus hydraulic fluid supplied to the cylinder 25 will extend the piston assembly 23 to maintain the shank 18 in the ground. If an obstruction or increased loading is encountered by the shank 18, a force will be applied to the shank 18 tending to pivot it upwardly and rearwardly as shown in FIG. 2 and causing inward movement of the piston assembly 23 into the cylinder 25 against the pressure of fluid in the cylinder 25. If the force applied by the shank 18 causes the piston assembly 23 to be moved a predetermined distance into the cylinder 25, fluid pressure in the cylinder 25 is partially relieved to allow for further freer movement of the shank 18 upwardly in the manner shown in FIG. 3 to clear the obstruction to prevent the possibility of damage to the shank 18 or tool 19.

Figure 4:
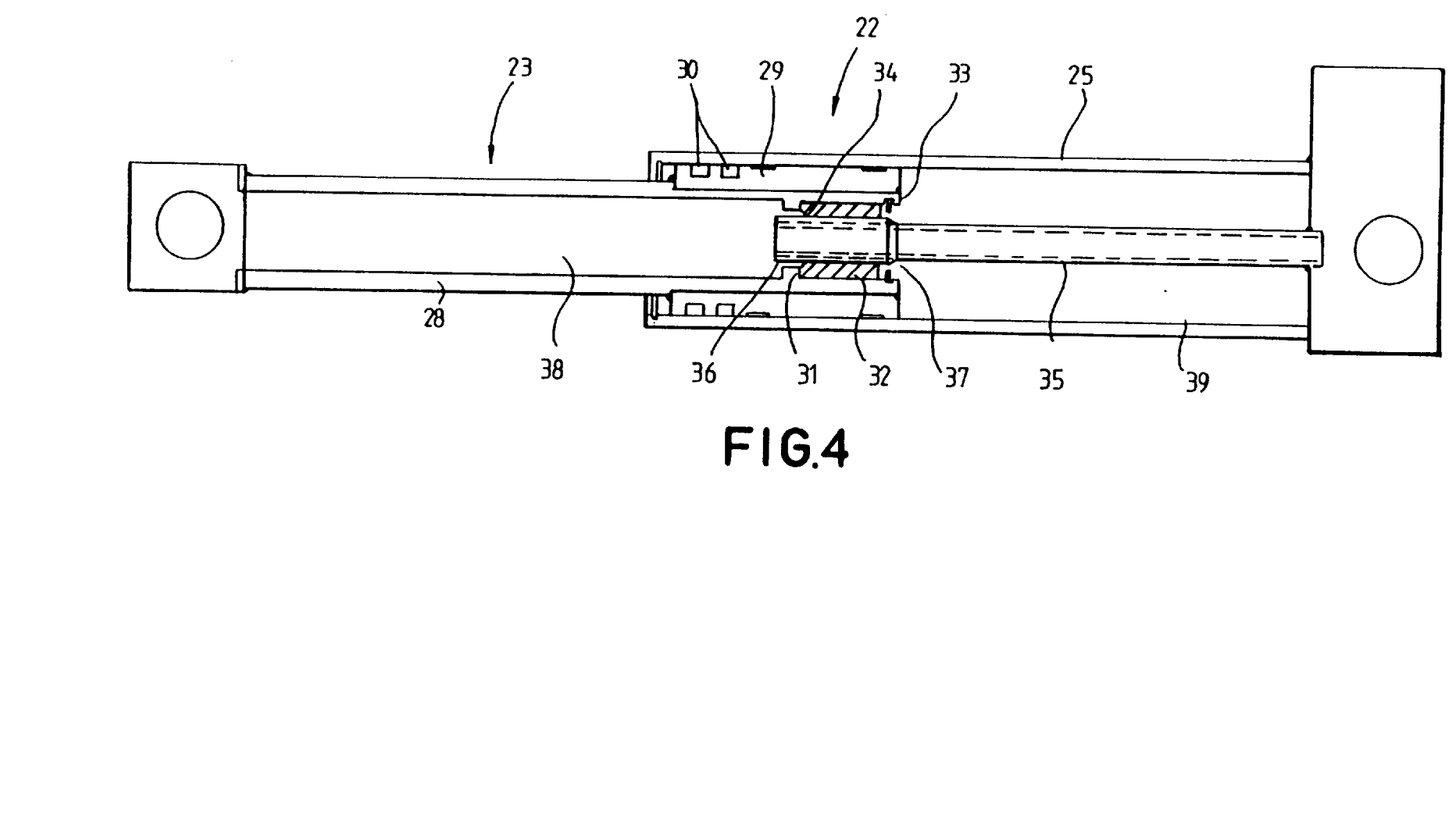
FIG. 4 is a sectional view of the ram for use in the tool assembly of the invention.

To enable this action to be achieved, the hydraulic ram 22 is of the construction shown in FIG. 4. The piston assembly 23 of the ram 22 includes a hollow piston rod 28 which carries at one end a piston 29 provided with appropriate seals 30, the piston 29 being arranged for sliding movement within the cylinder 25. An annular shoulder 31 is formed inwardly of the "piston" end of the rod 28 against which an annular insert 32 abuts, the insert 32 being retained in position by means of a circlip 33. The insert 32 has its trailing end annularly chamfered as at 34 for a purpose as will be described further below.

The cylinder 25 extends from, and is secured to, the end block 26 by welding or by other connection arrangement or alternatively the cylinder 25 may be integrally formed with the end block 26. A hollow tubular member 35 is rigidly attached to or integrally formed with the block 26 and is arranged co-axially with the piston rod 28 and extends into the piston rod 28 and piston 29. The hollow tubular member 35 carries at its free end, an annular valve member 36 having an annular chamfered end face 37 facing opposite the face 34 of the insert 32. The valve member 36 is sealingly engaged with the insert 32 but is slidable relative thereto.

The insert 32 is formed of a plastics material and when subject to fluid pressure within the cylinder 25 it is forced towards the shoulder 31 so that it is compressed axially and caused to expand radially to be urged into firm engagement with the valve member 36 to maintain sealing therebetween.

Figure 10:
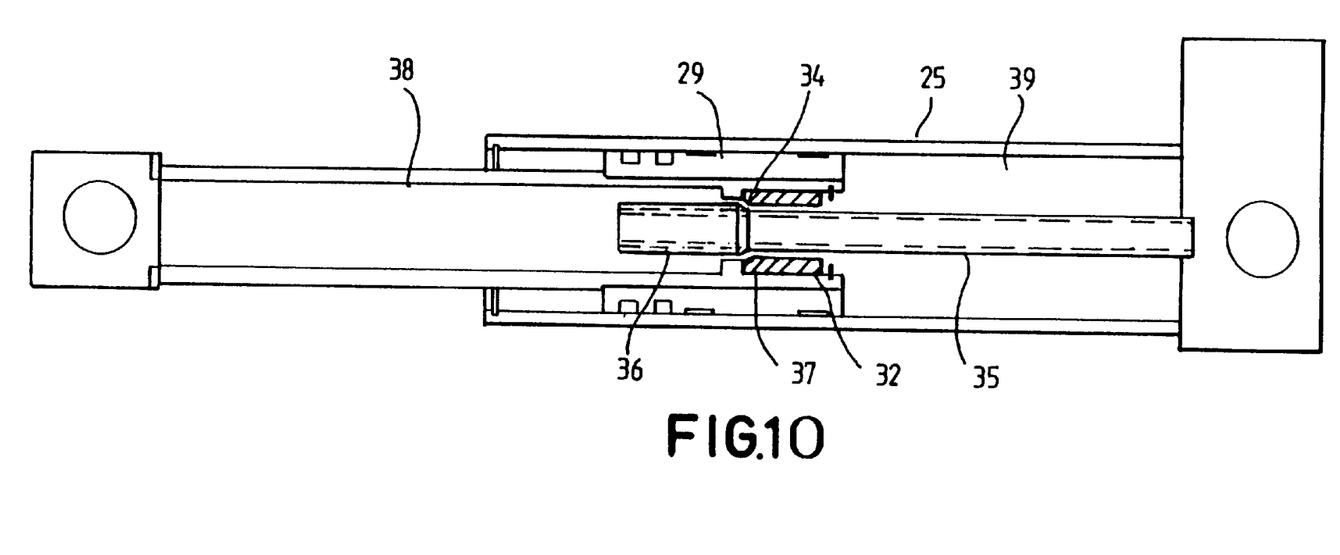
FIG. 10 illustrates the ram of FIG. 4 in the pressure release attitude.

The co-operation between the valve member 36 and insert 32 provides a fluid separation between the interior 38 of the piston rod 28 and the interior 39 of the cylinder 25 until the piston rod 23 and piston 29 are moved a predetermined distance into the cylinder 25 as governed by the distance between the respective chamfered faces 34 and 37. When this predetermined degree of movement occurs, the face 37 moves to a position adjacent and past the face 34 permitting fluid communication between the interior 38 of the piston rod 28 and interior 39 of the cylinder 25 as shown in FIG. 10. This also allows communication between the interior 39 of the cylinder 25 and the interior of the hollow tubular member 35.

Figure 5:
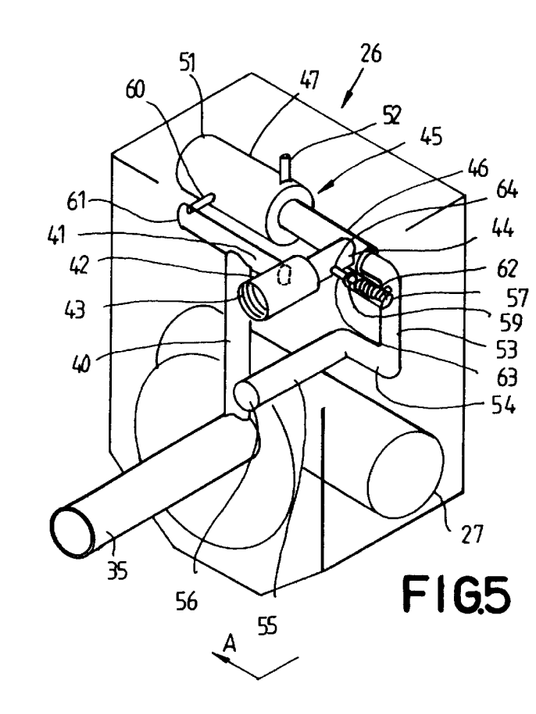
FIG. 5 is a perspective cut-away view of the end block of the cylinder of the ram of FIG. 4.
Figure 6:
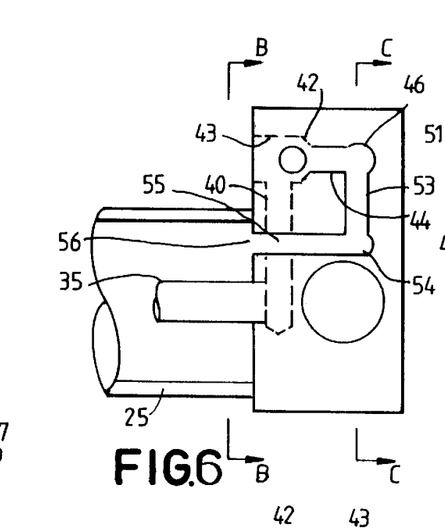
FIG. 6 is a schematic longitudinal sectional view of the block and part of the cylinder in the direction A—A of FIG. 5 with the multiplier omitted.
Figure 7:
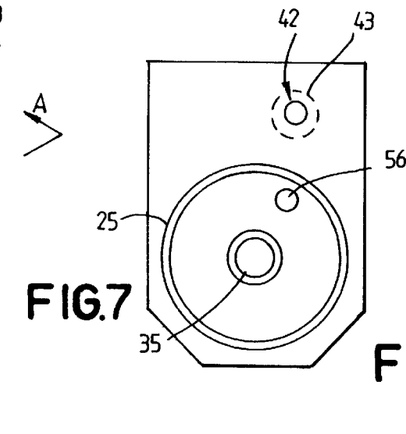
FIG. 7 is a sectional elevational view along line B—B of FIG. 6.

As stated above, the hollow tubular member 35 is connected to the block 26 and as shown in FIGS. 5 and 6 communicates with a first upright passage 40 in the block 26 which at its upper end is connected through a further passage 41 to a chamber 42, the latter opening to one side of the block 26 and being internally threaded at 43 so as to permit connection via hydraulic hose to the hydraulic circuit of the prime mover or a hydraulic accumulator. The chamber 42 communicates through a passage 44 and a second chamber 45 which has a first portion 46 with a further portion 47 of enlarged diameter relative to the first portion 46. A stepped piston assembly 48 (see FIG. 8) is located within the chamber 45 having connected pistons 49 and 50 located in the respective chamber portions 46 and 47. The end 51 of the chamber portion 47 is blocked by a screw-in plug, whilst an air vent passage 52 vents the chamber portion 47 forwardly of the piston 50 to the atmosphere. The arrangement of piston assembly 48 within the chamber 45 serves as an hydraulic pressure multiplier as described further below.

Figure 8:
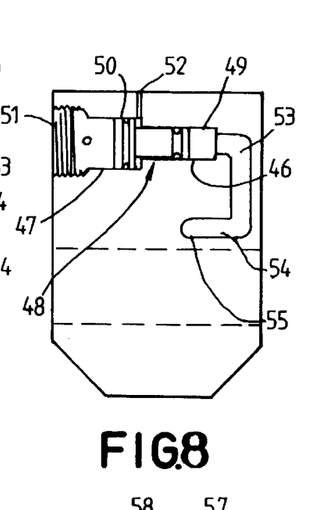
FIG. 8 is a sectional view along line C—C of FIG. 6.
Figure 9:
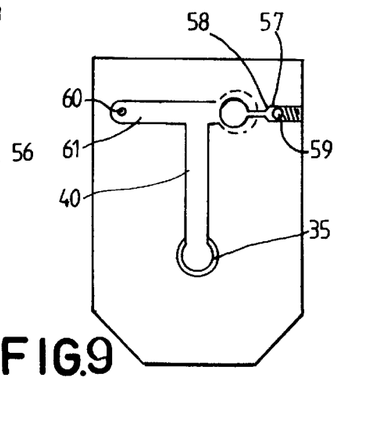
FIG. 9 is a schematic sectional view in the direction B—B of FIG. 6 with details to the right of line D—D omitted.

The chamber portion 46 additionally is connected via respective passages 53, 54 and 55 to the interior 39 of the cylinder 25 with the passage 55 opening into the cylinder 25 at 56. The piston assembly 48 also acts as a valve with fluid pressure in the chamber portion 47 normally forcing the piston assembly 48 to one end of the chamber 45 (to the right as shown in FIG. 8) so as to block communication of the passage 44 with the chamber portion 46. In addition the piston 49 is forced hard up against the end of the chamber portion 46 to block communication of the passage 53 with the chamber portion 46 and the passage 44. A further passage 57 is connected to the passage 44 and passage 53, the passage 57 including a valve seat 58 on which a ball valve 59 may seat. Further intersecting passage 60 and 61 connect the chamber portion 47 rearwardly of the piston 50 to the chamber 42.

In use, and where the chamber 42 is connected to a supply of hydraulic fluid, for example at 2000 psi, that fluid flows through the passages 41, 61 and 60 to the chamber portion 47 to act on the piston assembly 48 to urge the piston assembly 48 to the right as shown in FIG. 8 to cause the piston 49 to block off communication of the passage 44 with the chamber portion 46 and also be forced up against the end of the chamber portion 46. Thus, fluid flowing into the chamber 42 is blocked from communication with the chamber portion 46 through the passageway 44 because of the position of the piston 49. Supply of fluid to the chamber portion 47 causes, through the stepped nature of the piston assembly 45, a multiplying pressure effect at the end of the piston 49 proportional to the respective surface areas of the pistons 50 and 49. For example, if, as in this instance, the pistons 50 and 49 have a ration of 3:1, the pressure seen at the end of the chamber 46 is three times the pressure in the chamber portion 47. Thus in the present case, under maximum load, the pressure at the end of the chamber portion is 6000 psi. when the pressure in the chamber portion 47 is 2000 psi. This pressure is also seen, because of the passages 53, 54 and 55 at the interior 39 of the cylinder 25. When an obstruction is encountered causing a force to be applied to the tool shank 18, the piston 29, when the applied force exceeds a predetermined level, will move within the cylinder 25 and towards the end block 26 thus creating in the cylinder 25 a pressure which can reach, in this embodiment, up to three times the accumulator or hydraulic system pressure.

In operation and where a very high resistance is encountered for example where the shank 18 or tool 19 strikes a large obstruction, the piston assembly 23 will be urged inwardly against the fluid pressure within the cylinder 25 as determined by the pressure multiplier piston assembly 48. As the piston 29 moves within the cylinder 25 towards the block 26 overcoming that pressure, fluid will be caused to flow through the passages 55, 54 and 53 to the end of the chamber portion 46 to act on the piston 49. The piston assembly 48 will thus be forced to move rearwardly. Movement of the piston assembly 48 is permitted as the chamber portion 47 between the pistons 49 and 50 is vented through the passage 52 to atmosphere. Communication between the chamber 46 and passage 44 is opened when the piston assembly 48 moves a predetermined amount permitting fluid in the interior 39 of the cylinder 25 to flow back to the accumulator or hydraulic system. Where a predetermined movement of the piston 29 occurs, the valve member 36 and insert 34 will be moved to a position where the surfaces 34 and 37 are spaced apart to permit fluid to flow from the interior 39 of the cylinder 25 into the member 35 to pass into the passage 40. The passage 40, however, is subject to the reduced pressure through its connection via the passage 41 to the chamber 42 which is connected to the hydraulic accumulator or normal fluid pressure supply, in this case 2000 psi. This thereby reduces the pressure of fluid within the cylinder 25 which allows the shank 18 to have less resistance to movement and pivot upwardly and clear the obstructions in the manner shown in FIGS. 2 and 3.

Fluid at system pressure is continued to be supplied to the interior 39 of the cylinder 25 through the tubular member 35 and past the insert 32 and valve member 36 which are open, so as to act on the face of the piston 29. Some fluid will also be supplied from the chamber 42 past the valve 59 and through the passages 53, 54 and 55 to the interior of the cylinder 39. The pressure of the fluid supplied to the interior 39 of the cylinder 25 however is at the reduced system pressure, in this instance 2000 psi. The piston assembly 23 will thus be caused to extend from the cylinder 25 with the ram 22 expanding to urge the tool shank 18 from the position of FIG. 3 back towards the positions of FIG. 2 and FIG. 1 with the tool 19 being forced into the ground. When however the piston 29 has move a predetermined degree, the valve opening between the valve member 36 and insert 32 will close thereby blocking fluid supply through the tube 35. Fluid however will continue to flow from the chamber 42 through the passage 44 and past the ball valve 59 into the passages 53, 54 and 55 into the interior 39 of the cylinder 25 to act on the piston 29 to continue extension of the piston assembly 23 and thereby urge the tool shank 18 back towards the position of FIG. 1.

As is apparent in FIG. 5 the ball valve chamber 57 has a seat 58 upon which the ball 59 seats under the biasing effect of a spring 62. A passage 63 is connected between the valve seat 58 and chamber 44 to communicate the valve chamber 47 with the chamber 44. The passage 63 is of reduced diameter which limits the rate of flow of fluid from the chamber 44 to the passages 53, 54 and 55 to the interior 39 of the cylinder 25. This will reduce the speed of movement of the shank 18 back into the ground thereby minimising shock loadings on the shank and other components of the tool assembly 10. This overcomes a disadvantage of conventional systems where to return a shank into the ground, the ram is subject to full flow from a hydraulic circuit causing rapid movement of the shank 18 into the ground and high shock loadings on the assembly.

The tool shank 18 is thus returned to the position of FIG. 1 and able to act in the manner described previously.

In the preferred embodiment movement of the tool is opposed by a fluid pressure ram using hydraulic fluids. Pneumatic rams however may also be used for opposing tool movement.

The soil penetrating tools as used in the tool assemblies described above may be of many different designs and include single or multiple soil penetrating tips. In addition the tool may include multiple tool shanks whose movement from their operative attitude is opposed in the manner described.

All such variations and modifications are deemed to fall within the broad scope and ambit of the invention as herein set forth.

I claim:

1. A soil penetrating tool assembly, said tool assembly including:

a soil penetrating tool arranged for movement between a lowered normal operating position and a raised position wherein said tool can pass an obstruction, fluid ram means associated with said tool, said ram means comprising a cylinder and piston means movable in said cylinder, fluid pressure relieving means associated with said ram means, said fluid pressure relieving means normally resisting displacement of fluid from said ram means and thereby movement of said piston means relative to said cylinder and movement of said tool from said operating position, said fluid pressure relieving means permitting movement of said piston means relative to said cylinder and thus said movement of said tool when pressure of fluid within said ram means, consequent upon said tool encountering an obstruction, exceeds a predetermined maximum pressure, and valve means internally of said ram means, said valve means connecting said fluid ram means to a fluid supply having a pressure lower than said predetermined maximum pressure when said movement of said piston means exceeds a predetermined movement whereupon said tool is permitted to move towards said raised position to pass said obstruction.

2. The soil penetrating tool assembly according to claim 1 wherein said valve means includes a first valve part fixed against movement relative to said cylinder and a second valve part movable with said piston means.

3. The soil penetrating tool assembly according to claim 2 and including a fluid supply tube connected to said fluid supply, said fluid supply tube extending longitudinally into said cylinder from one end thereof, said valve means controlling communication between said tube and said cylinder.

4. The soil penetrating tool assembly according to claim 3 wherein said tube has a free end within said cylinder, said free end of said tube carrying said first valve part of said valve means and wherein said second valve part of said valve means is adapted for cooperation with said first valve part.

5. The soil penetrating tool assembly according to claim 4 wherein said predetermined movement of said piston means relative to said cylinder moves said valve parts out of register with each other to permit fluid flow therepast through said tube from said fluid supply into said cylinder.

6. The soil penetrating tool assembly according to claim 5 wherein said first valve part comprises an annular member or enlargement at said free end of said tube.

7. The soil penetrating tool assembly according to claim 6 wherein said piston means is hollow to receive said free end of said tube, and wherein said second valve part comprises an annular insert within said hollow piston means.

8. The soil penetrating tool assembly according to claim 7 wherein said annular insert is formed of plastics material, said insert when subject to fluid pressure within said cylinder expanding into sealing engagement with said first valve part when said valve means are closed.

9. The soil penetrating tool assembly according to claim 8 wherein said hollow piston means comprises a hollow piston rod carrying a piston movable within said cylinder, said hollow piston rod receiving said free end of said fluid supply tube.

10. The soil penetrating tool assembly according to claim 3 and including an end housing adjacent said one end of said cylinder, said end housing supporting said fluid supply tube and connecting said fluid supply tube to said fluid supply.

11. The soil penetrating tool assembly according to claim 1 wherein said fluid pressure relieving means comprising a fluid pressure multiplier connected to said fluid supply.

12. The soil penetrating tool assembly according to claim 11 wherein said fluid pressure multiplier comprises a stepped piston having a larger piston end exposed to said fluid supply pressure and a smaller piston end communicating with said cylinder.

13. The soil penetrating tool assembly according to claim 12 wherein said fluid supply is further connected to said cylinder through additional passage means, said passage means having a restricted area to restrict flow to said cylinder after said valve means is closed to return said tool to said operating position at a reduced rate upon passing said obstruction.

14. The soil penetrating tool assembly according to claim 1 wherein said tool is mounted for pivotal movement between its said lowered and raised positions.

15. The soil penetrating tool assembly according to claim 14 and including mounting means for mounting said tool assembly to a tool bar.

16. The soil penetrating tool assembly according to claim 15 wherein said tool is supported to said mounting means through linkage means.

17. The soil penetrating tool assembly according to claim 16 wherein said linkage means comprises a pivotal link assembly which is pivotally mounted at one end to said mounting means and which pivotally supports at its opposite end said tool.

18. The soil penetrating tool assembly according to claim 17 wherein said fluid ram means is connected between said tool and said mounting means.

19. The soil penetrating tool assembly, said tool assembly including a soil penetrating tool, support means for said tool, linkage means pivotally connected to said tool and said support means for supporting said tool for movement between a lowered normal operating position and a raised position wherein said tool can pass an obstruction, fluid ram means pivotally connected between said tool and said support means, said ram means comprising a cylinder and a piston means movable in said cylinder, fluid pressure relieving means associated with said ram means, said fluid pressure relieving means normally resisting displacement of fluid from said ram means and thereby movement of said piston means relative to said cylinder and movement of said tool from said operating position, said fluid pressure relieving means permitting movement of said piston means relative to said cylinder and thus said movement of said tool when pressure of fluid within said ram means, consequent upon said tool encountering an obstruction, exceeds a predetermined maximum pressure, and valve means internally of said ram means, said valve means connecting said fluid ram means to a fluid supply having a pressure lower than said predetermined maximum pressure when said movement of said piston means exceeds a predetermined movement whereupon said tool is permitted to move towards said raised position to pass said obstruction.

20. A fluid ram assembly, said ram assembly including a cylinder and a piston means movable in said cylinder, fluid pressure relieving means resisting displacement of fluid from said fluid ram assembly and thereby resisting movement of said piston means in said cylinder from a first position unless pressure of fluid within said ram assembly exceeds a predetermined maximum pressure, and valve means internally of said ram assembly, said valve means connecting said ram assembly to a fluid supply having a pressure lower than said predetermined maximum pressure upon a predetermined movement of said piston means in said cylinder from said first position to allow a less restricted movement of said piston means in said cylinder away from said first position.

21. The fluid ram assembly according to claim 20 wherein said valve means includes a first valve part fixed against movement relative to said cylinder and a second valve part fixed for movement with said piston means.

22. The fluid ram assembly according to claim 21 and including a fluid supply tube connected to said fluid supply, said fluid supply tube extending longitudinally into said cylinder, said valve means controlling communication between said tube and said cylinder.

23. The fluid ram assembly according to claim 22 wherein said tube has a free end within said cylinder, said end carrying said first valve part of said valve means and wherein a second valve part of said valve means is arranged on said piston means for movement therewith and adapted for cooperation with said first valve part.

24. The fluid ram assembly according to claim 23 wherein movement of said valve parts out of register with each other permits fluid flow therepast from said fluid supply into said cylinder upon said predetermined movement of said piston means.

25. The fluid ram assembly according to claim 23 wherein said first valve part comprises an annular member of enlargement at said free end of said tube.

26. The fluid ram assembly according to claim 25 wherein said piston means is hollow to receive said free end of said tube, and wherein said second valve part comprises an annular insert within said piston means.

27. The fluid ram assembly according to claim 26 wherein said annular insert is formed of plastics material, said insert when subject to fluid pressure within said cylinder expanding into sealing engagement with said first valve part when said valve means are closed.

28. The fluid ram assembly according to claim 27 wherein said hollow piston means comprises a hollow piston rod carrying a piston movable within said cylinder, said hollow piston rod receiving said free end of said tube.

29. The fluid ram assembly according to claim 21 wherein said fluid pressure relieving means comprises a fluid pressure multiplier connected to said fluid supply.

30. The fluid ram assembly according to claim 29 wherein said fluid pressure multiplier comprises a stepped piston having a larger piston and exposed to said fluid supply pressure and a small piston end communicating with said cylinder.

31. The fluid ram assembly according to claim 30 wherein said fluid supply is connected to said cylinder through additional passage means, said additional passage means having a restricted area to restrict flow to said cylinder after said valve means is closed to return said piston means to said first position at a reduced rate.

32. A soil penetrating tool assembly, said tool assembly including:
  a soil penetrating tool arranged for movement between a lowered normal operating position and a raised position wherein said tool can pass an obstruction,
  fluid ram means associated with said tool, said ram means comprising a cylinder and piston means movable in said cylinder,
  fluid pressure relieving means associated with said ram means, said fluid pressure relieving means normally resisting displacement of fluid from said ram means and thereby movement of said piston means relative to said cylinder and movement of said tool from said operating position, said fluid pressure relieving means permitting movement of said piston means relative to said cylinder and thus said movement of said tool when pressure of fluid within said ram means, consequent upon said tool encountering an obstruction, exceeds a predetermined maximum pressure,
  a fluid supply tube connected to a fluid supply having a pressure lower than said predetermined maximum pressure, said fluid supply tube extending longitudinally into said cylinder from one end thereof, and
  valve means internally of said ram means, said valve means connecting said ram means to said fluid supply through said fluid supply tube when said movement of said piston means exceeds a predetermined movement whereupon said tool is permitted to move towards said raised position to pass said obstruction.

33. A fluid ram assembly, said ram assembly including a cylinder and a piston means movable in said cylinder, fluid pressure relieving means resisting displacement of fluid from said fluid ram assembly and thereby resisting movement of said piston means in said cylinder from a first position unless pressure of fluid within said ram assembly exceeds a predetermined maximum pressure,
  valve means internally of said ram assembly,
  a fluid supply tube connected to said fluid supply, said fluid supply tube extending longitudinally into said cylinder, and
  said valve means controlling communication between said tube and said cylinder and connecting said cylinder through said tube to said fluid supply upon a predetermined movement of said piston means in said cylinder from said first position to allow a less restricted movement of said piston means in said cylinder away from said first position.

34. A soil penetrating tool assembly, said tool assembly including a soil penetrating tool, support means for said tool, linkage means pivotally connected to said tool and said support means for supporting said tool for movement between a lowered normal operating position and a raised position wherein said tool can pass an obstruction, fluid ram means pivotally connected between said tool and said support means, said ram means comprising a cylinder and a piston means movable in said cylinder, fluid pressure relieving means associated with said ram means, said fluid pressure relieving means normally resisting displacement of fluid from said ram means and thereby movement of said piston means relative to said cylinder and movement of said tool from said operating position, said fluid pressure relieving means permitting movement of said piston means relative to said cylinder and thus said movement of said tool when pressure of fluid within said ram means, consequent upon said tool encountering an obstruction, exceeds a predetermined maximum pressure,
  a fluid supply tube connected to a fluid supply having a pressure lower than said predetermined maximum pressure, said fluid supply tube extending longitudinally into said cylinder, and
  valve means internally of said ram means, said valve means connecting said fluid ram means to said fluid supply through said fluid supply tube when said movement of said piston means exceeds a predetermined movement whereupon said tool is permitted to move towards said raised position to pass said obstruction.

* * * * *